(12) United States Patent
Bhatia

(10) Patent No.: US 12,248,801 B2
(45) Date of Patent: Mar. 11, 2025

(54) UPDATE OF VIRTUAL MACHINES USING CLONES

(71) Applicant: VMWARE, INC., Palo Alto, CA (US)

(72) Inventor: Kashish Bhatia, Bangalore (IN)

(73) Assignee: VMware LLC, Palo Alto, CA (US)

( * ) Notice: Subject to any disclaimer, the term of this patent is extended or adjusted under 35 U.S.C. 154(b) by 617 days.

(21) Appl. No.: 17/666,580

(22) Filed: Feb. 8, 2022

(65) Prior Publication Data

US 2023/0176889 A1 Jun. 8, 2023

(30) Foreign Application Priority Data

Dec. 8, 2021 (IN) .............................. 202141057069

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/45562* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS 9,411,620 B2 *  8/2016  Wang .................... G06F 3/0683
2018/0349233 A1 * 12/2018  Zaydman ............ G06F 11/2082

FOREIGN PATENT DOCUMENTS

CN          113868026 A  * 12/2021

* cited by examiner

*Primary Examiner* — Bing Zhao
(74) *Attorney, Agent, or Firm* — King Intellectual Asset Management (57) ABSTRACT

The disclosure provides an approach for upgrading a virtual machine (VM) using an instant clone. A method includes initiating updating of the VM on a host in a datacenter; creating a clone of the VM on the host, in response to initiating the update; receiving a first write input/output (I/O) request for a first data block; checking a first disk bitmap associated with a first delta disk for whether a first bit associated with the first data block is set; based on the first bit being set, checking a scanner bitmap for whether a second bit associated with the first data block is set; and based on the second bit being set: waiting until the first data block is merged into a second disk; and performing the first write I/O to the first data block in the second disk after the first data block is merged into the second disk.

20 Claims, 9 Drawing Sheets

FIG. 9

UPDATE OF VIRTUAL MACHINES USING CLONES

RELATED APPLICATION

Benefit is claimed under 35 U.S.C. 119(a)-(d) to Foreign Application Serial No. 202141057069 filed in India entitled "UPDATE OF VIRTUAL MACHINES USING CLONES", on Dec. 8, 2021, by VMware, Inc., which is herein incorporated in its entirety by reference for all purposes.

BACKGROUND

In a datacenter supporting virtualization, a physical computing device, referred to as a host, runs one or more virtualized endpoints such as virtual machines (VMs), containers, Docker containers, data compute nodes, isolated user space instances, namespace containers, or other virtual computing instances (VCIs). Though certain aspects are discussed herein with respect to VMs, it should be noted that the techniques may apply to other suitable VCIs as well.

An administrator of a datacenter may decide to update a VM in the datacenter. For example, a VM can be upgraded to have a higher level of compatibility, to higher version, and/or to take advantage of new hardware options and new features. Some VMs run a guest operating system (GOS). A GOS is an operating system installed inside a VM. The GOS can be different from a host OS, which may be running on a host machine in certain embodiments. In some cases, a VM is upgraded by upgrading the GOS running on the VM.

Updating VMs can be a tedious effort. In some cases, updating a VM requires downtime of the VM. In particular, the administrator puts the VM in a maintenance mode and, hence, the application(s) running inside the VM are stopped. The update also requires a reboot of the VM, which further contributes to the downtime. The downtime can be avoided by offloading the application(s) running inside the VM to another VM during the update; however, this causes additional consumption of resources on the other VM. These issues are exacerbated when multiple VMs are to be updated.

Accordingly, techniques are needed for updating a VM on a host in a datacenter.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method of upgrading a VM in a datacenter using clones. The method includes initiating updating of the VM on a host in a datacenter; creating a clone of the VM on the host, in response to initiating the update; receiving a first write input/output (I/O) request for a first data block; checking a first disk bitmap associated with a first delta disk for whether a first bit associated with the first data block is set, wherein the first disk bitmap includes a bit for each data block of the first delta disk indicating whether the data block has been modified, and wherein the first delta disk is associated with the clone of the VM; based on the first bit being set, checking a scanner bitmap for whether a second bit associated with the first data block is set, wherein the scanner bitmap includes a bit for each data block of the first delta disk indicating whether the data block is currently being merged into a second disk, and wherein the second disk is associated with the VM; and based on the second bit being set: waiting until the first data block is merged into a second disk; and performing the first write I/O to the first data block in the second disk after the first data block is merged into the second disk.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for upgrading a VM in a datacenter with use of a clone VM.

A clone VM is a copy of another VM. In some embodiments, a clone VM refers to an instant clone. Cloning creates a VM from the running state of another VM resulting in a destination VM (i.e., the clone VM) that is identical to the source VM. For example, the clone VM has a processor state, virtual device state, memory state, and disk state identical to the source VM from which it is cloned at the instant it is cloned.

In certain aspects, instant cloning uses rapid in-memory cloning of a running source VM, and copy-on-write (COW)

to rapidly deploy the clone VM. To create the clone VM, the source VM is stunned for a short period of time (e.g., less than 1 second) and brought to a quiescent state. While the source VM is stunned, a new writable delta disk is generated for each virtual disk of the VM, such that each virtual disk is represented by a base disk and a delta disk. A base disk of a virtual disk of the VM includes data of the virtual disk before the clone VM is made of the source VM. The delta disk is used to store data corresponding to writes to the virtual disk that occur after the clone VM is made of the source VM. It should be noted that in some cases, there may be multiple delta disks in a chain, each corresponding to a different snapshot/backup made in time of the virtual disk. The source VM and the clone VM share the base disk of the virtual disk, which may be put in a read-only state. However, each of the source VM and the clone VM may have its own respective delta disk where writes to virtual disk are made from the source VM and the clone VM, respectively. Thus, read I/O requests from both the source VM and the clone VM are served from the base disk, while write I/Os of the source VM are written to the delta disk of the source VM and write I/Os of the clone VM are written to the delta disk of the clone VM. Accordingly, if the clone VM modifies data on the virtual disk, the data on the source VM is not modified, thus preserving security and isolation between the source VM and the clone VM.

According to embodiments of the present disclosure, when an administrator marks a VM for update, a clone of the VM to be updated is created on the host. In some embodiments, the updating of the VM comprises a VM upgrade. Use of the clone VM avoids downtime during update of the VM, as application(s) and/or service(s) provided by the VM run on the clone VM during the update. After completion of the update, the clone VM can be removed. Before removing the clone VM, changed data blocks in the clone VM's delta disk can be merged into the source VM's delta disk, and then the source VM's delta disk is merged into the base disk.

During the merging of the disks, the host hypervisor runs a scanner thread and an I/O thread. The I/O thread is responsible for directing I/Os to the correct disk (e.g., the base disk, the source VM's delta disk, or the clone VM's delta disk). The base disk, the source VM's delta disk, and the clone VM's delta disk each are associated with a respective disk bitmap that contains a bit for each data block of the virtual disk. When the bit associated with a data block is set (e.g., has a value of 1) in a disk bitmap associated with a disk, the set bit indicates that the data block value has been changed in that disk from when the clone VM was created. When the bit is not set (e.g., has a value of 0), the data block value has not been changed in that disk from when the clone VM was created. The disk bitmaps, and in particular the value of the bit associated with a data block in each disk bitmap, can be used to determine which disk includes the most updated version of the data block corresponding to the latest write I/O for the data block, as discussed herein. These disk bitmaps can be leveraged to direct read I/Os and write I/Os to the correct disk.

The scanner thread is responsible for scanning for changed data blocks and merging the disks. The scanner thread also maintains a scanner thread bitmap that tracks data blocks that have already been merged and that are in the process of being merged. There may be one scanner thread bitmap for the merger of a source disk (e.g., delta disk) into a destination disk (e.g., another delta disk or a base disk). The scanner thread bitmap similarly includes a bit for each data block of the virtual disk. When the bit associated with a data block is set (e.g., has a value of 1) in the scanner thread bitmap, the set bit indicates that the data block is currently being merged from the source disk to the destination disk. When the bit is not set (e.g., has a value of 0), the data block is not currently being merged, as in it has not been merged yet, or merger has been completed.

In certain embodiments, the scanner thread scans the disk bitmap of the source disk being merged into the destination disk, for example in linear fashion according to data block address, and, when the scan finds a bit that is set (indicating the data block is changed in the source disk), the scanner sets the corresponding bit in the scanner thread bitmap (indicating the data block is being merged from source disk to destination disk) and merges the data block from the source disk to the destination disk. The I/O thread synchronizes with the scanner thread by checking the scanner thread bitmap to check whether a data block is in the process of being merged before directing the I/O to a particular disk.

The techniques described herein for updating a VM may allow for reduced application and/or service downtime during the update for a more seamless update. Although the disclosure is described with reference to VMs, the teachings herein also apply to updates of other suitable VCIs.

Figure 1:
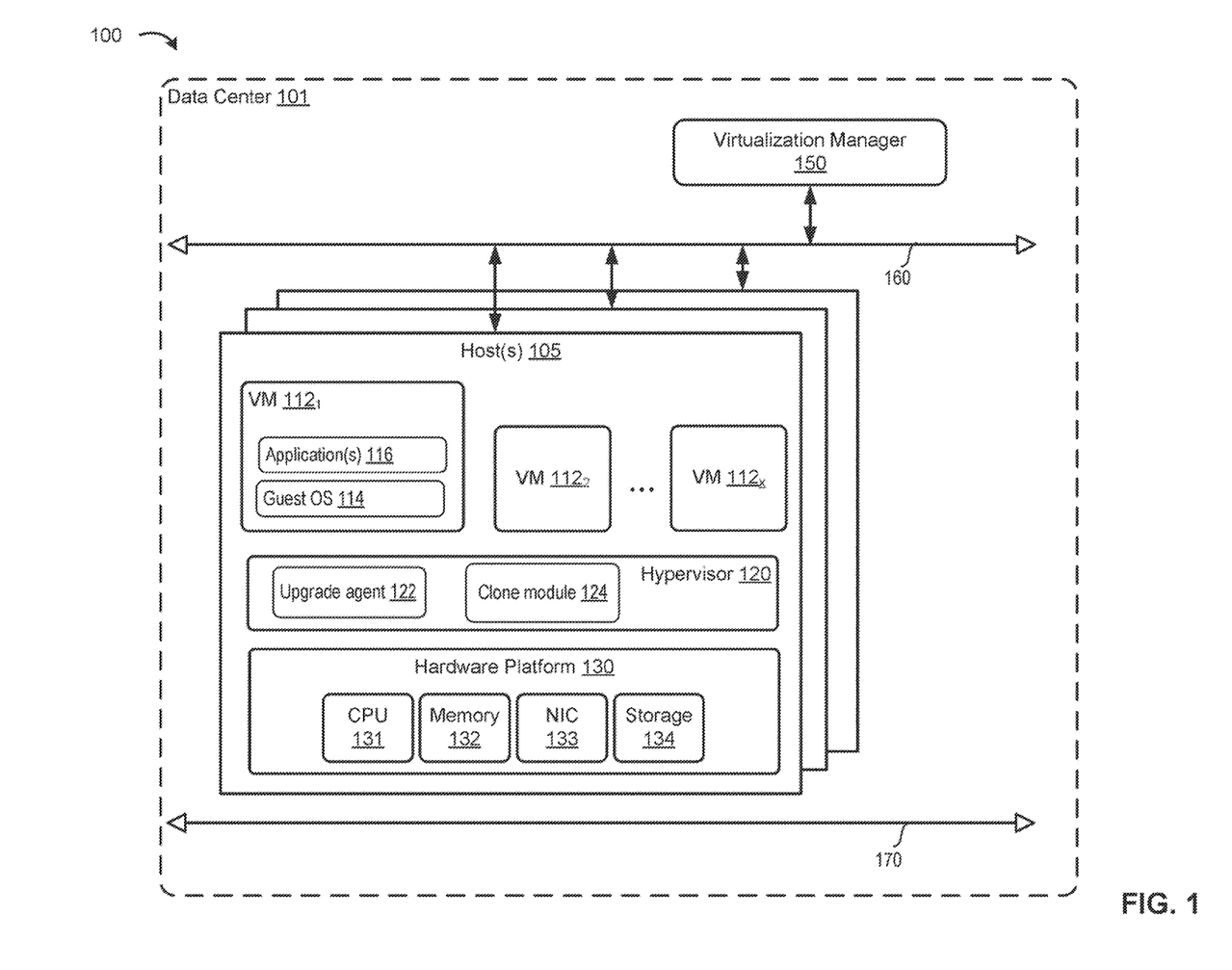
FIG. 1 depicts a block diagram of a datacenter, according to one or more embodiments.

FIG. 1 depicts example physical and virtual network components in a networking environment 100 in which embodiments of the present disclosure may be implemented. Networking environment 100 includes a data center 101. Data center 101 includes one or more hosts 105, a management network 160, a data network 170, and a virtualization manager 150. Although management network 160 and data network 170 are shown as separate physical networks, in some implementations management network 160 is logically isolated from data network 170 as separate virtual local area networks (VLANs) on the same physical network.

Host(s) 105 may be communicatively connected to data network 170 and management network 160. Host(s) 105 may be geographically co-located servers on the same rack or on different racks in any arbitrary location in the data center. Host(s) 105 may be constructed on a server grade hardware platform 130, such as an x86 architecture platform. Host(s) 105 are configured to provide a virtualization layer, also referred to as a hypervisor 120, that abstracts processor, memory, storage, and networking resources of hardware platform 130 into multiple VMs $112_1$ to $112_N$ (collectively referred to as VMs 112 and individually referred to as VM 112) that run concurrently on the same host 105.

Hypervisor 120 can be installed as system level software directly on the hardware platform 130 (often referred to as "bare metal" installation) and be conceptually interposed between the physical hardware and the guest operating systems (GOSs) executing in VMs 112. Alternatively, the virtualization software may conceptually run "on top of" a conventional host operating system in the server. In some implementations, hypervisor 120 may comprise system level software as well as a "Domain 0" or "Root Partition" VM, which is a privileged machine that has access to the physical hardware resources of host 105. One example of hypervisor 120 that may be used is a VMware ESXi™ hypervisor provided as part of the VMware vSphere® solution made commercially available from VMware, Inc. of Palo Alto, California. Hypervisor 120 may also include an upgrade agent 122 and a clone module 124. Although shown in hypervisor 120, in some embodiments, upgrade agent 122 and/or clone module 124 may run outside hypervisor 120 on host 105. As described in more detail herein, upgrade agent 122 may be notified by virtualization manager 150 when a VM, e.g., VM $112_1$, is to be upgraded. Upgrade agent 122 may be responsible for executing commands to direct the upgrade of VM $112_1$. When upgrade agent 122 is notified of the upgrade, upgrade agent 122 sends a call to clone module 124 to create a clone of VM $112_1$. Clone module 124 is responsible for creating clones of VMs 112. The operations for updating the VM $112_1$ are discussed in more detail below with respect to FIGS. 2-4.

Each VM 112 includes a guest OS 114 and one or more applications 116. Application(s) 116 run on top of guest OS 114. Guest OS 114 may be a standard, commodity operating system. An application 116 may be any software program, such as a word processing program. One example of an application 116 running on top of guest OS 114 is a virtual desktop interface (VDI).

Hardware platform 130 of a host 105 may include components of a computing device such as one or more processors (CPUs) 131, memory 132, one or more network interface cards (e.g., NIC 133) including one or more network adapters, storage 134, and other components (not shown). CPU 131 is configured to execute instructions, for example, executable instructions that perform one or more operations described herein and that may be stored in memory 132 and storage 134. NIC 133 enables host 105 to communicate with other devices via a communication medium, such as data network 170 and/or management network 160.

Storage 134 represents persistent storage devices (e.g., one or more hard disks, flash memory modules, solid state disks (SSDs), and/or optical disks). Host 105 may be coupled to one or more external storages (not shown), such as a storage area network (SAN). Other external storages that may be used include network-attached storage (NAS) and other network data storage systems, which may be accessible via NIC 133.

Memory 132 is hardware allowing information, such as executable instructions, configurations, and other data, to be stored and retrieved. Memory 110 stores programs and data when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Data center 101 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions.

Virtualization manager 150 generally represents components of a management plane comprising one or more computing devices responsible for receiving logical network configuration inputs, such as from a user or network administrator, defining one or more endpoints (e.g., VCIs) and the connections between the endpoints, as well as rules governing communications between various endpoints. Virtualization manager 150 communicates with hosts 105 via a network, shown as management network 160, and carries out administrative tasks for data center 101 such as managing hosts 105, managing VMs 112 running within each host 105, provisioning VMs, migrating VMs from one host to another host, upgrading VMs 112, and load balancing between hosts 105. Virtualization manager 150 may be a computer program that resides and executes in a central server in data center 101 or, alternatively, virtualization manager 150 may run as a virtual appliance (e.g., a VM 112) in one of hosts 105. One example of a virtualization manager is the vCenter Server™ product made available from VMware, Inc. of Palo Alto, California.

Figure 2:
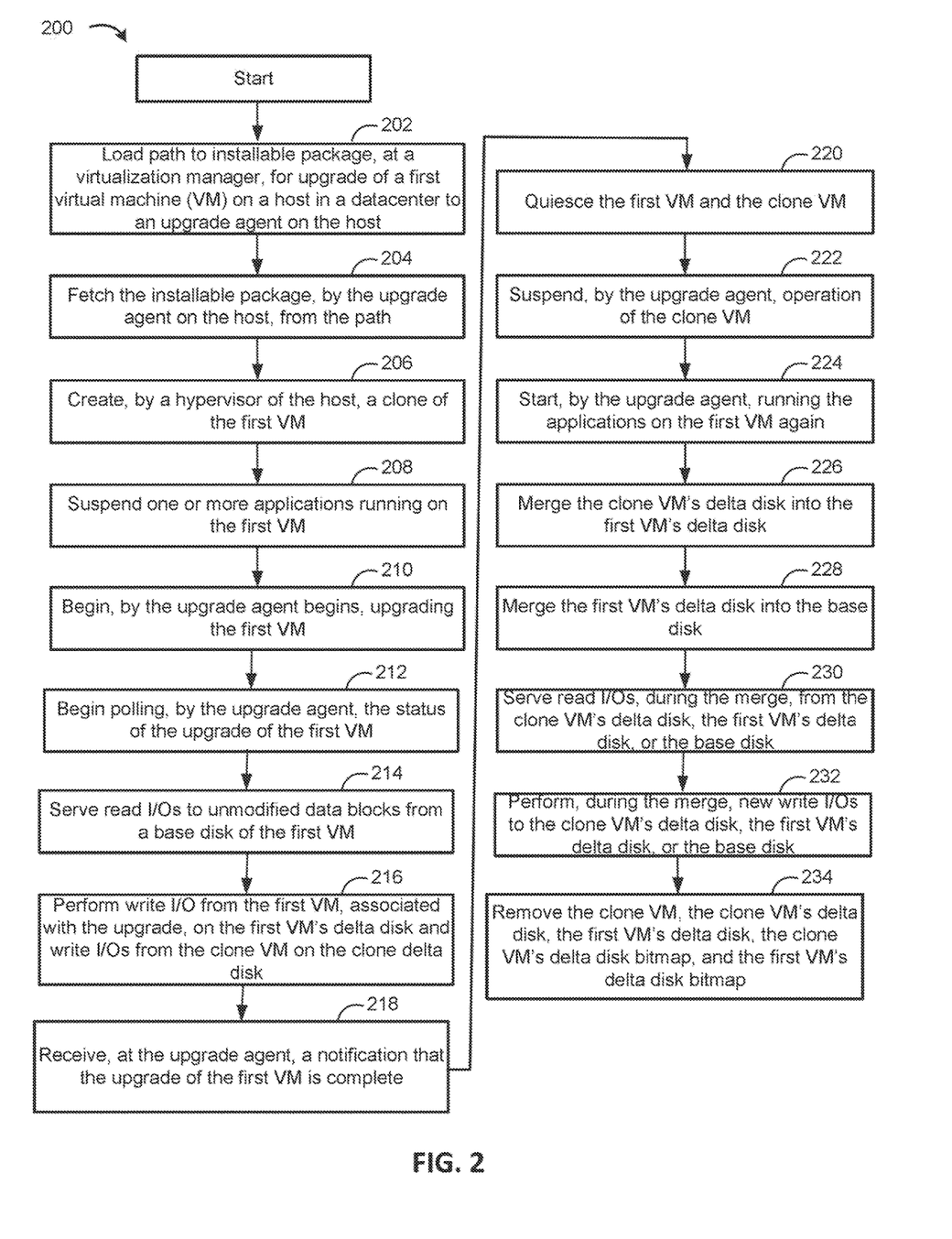
FIG. 2 depicts a flow diagram illustrating example operations for upgrading a VM using a VM clone, according to one or more embodiments.

As discussed in more detail herein, virtualization manager 150 may upgrade a VM 112. In some embodiments, an administrator marks one or more VMs 112, e.g., VM $112_1$, for an upgrade. FIG. 2 depicts a flow diagram illustrating example operations 200 for upgrading a VM using a VM clone, according to one or more embodiments. Operations 200 may be further understood and described with reference to the FIGS. 3-8.

At block 202, virtualization manager 150 loads the path (e.g., URL) to an installable package for upgrade of a first VM, e.g., VM $112_1$, in data center 101 to upgrade agent 122 on host 105. In some embodiments, the installable package include an upgrade to GOS 114 running on VM $112_1$.

At block 204, upgrade agent 122 on host 105 fetches the installable package from the path.

Figure 3:
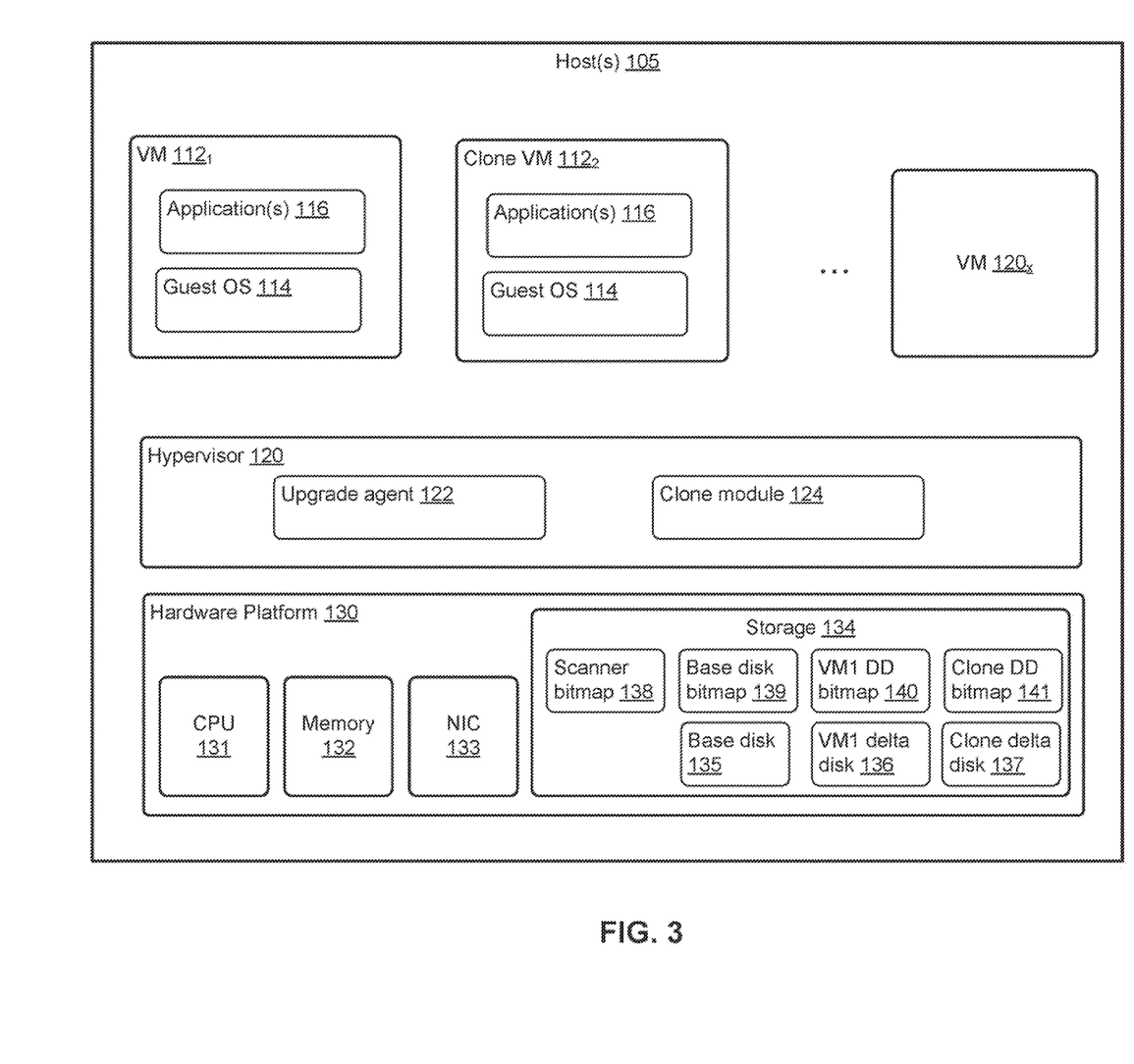
FIG. 3 depicts a block diagram of a datacenter with a clone VM of a first VM, according to one or more embodiments.
Figure 4A:
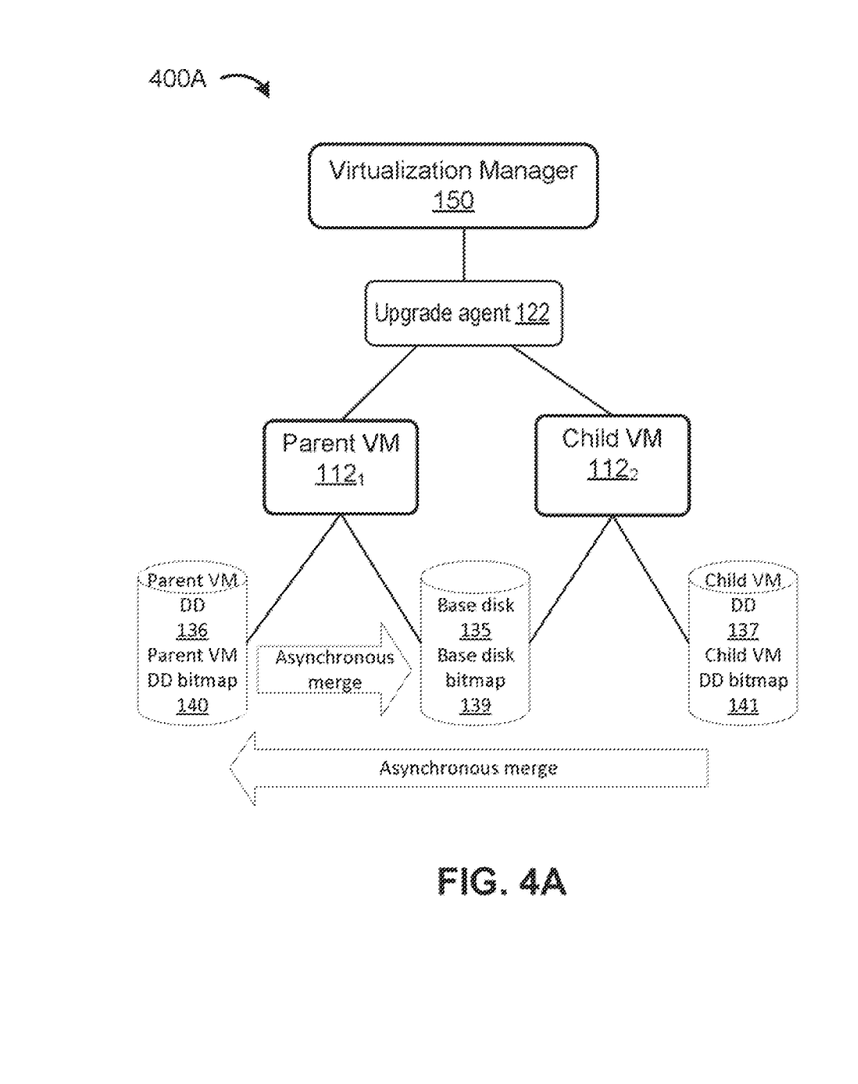
FIG. 4A depicts a block diagram conceptually illustrating merging delta disks of the clone VM and the first VM, according to one or more embodiments.

Upgrade agent 122 instructs hypervisor 120 to create a clone of VM $112_1$. At block 206, hypervisor 120 creates clone VM $112_2$ of VM $112_1$. In some embodiments, upgrade agent 122 send a hypervisor call (e.g., an I/O control (IOCTL) notification) to clone module 124 to spawn a clone of VM $112_1$. FIG. 3 depicts a block diagram of a data center 101 with a clone VM $112_2$ of a first VM, VM $112_1$, according to one or more embodiments. Clone module 124 may stun VM $112_1$ for a short period and bring VM $112_1$ to a quiescent state. Stunning the VM $112_1$ pauses the execution of VM $112_1$ to allow in-flight I/Os to be completed. Once VM $112_1$ is quiesced, clone module 124 creates a copy of VM $112_1$ on host 105. As shown in FIG. 3, a clone VM $112_2$ is created of VM $112_1$. While VM $112_1$ is stunned, a new writable delta disk is generated for each virtual disk of VM $112_1$. As shown in FIG. 3, storage 134 includes base disk 135, a delta disk for VM $112_1$ (VM1 delta disk 136), and a delta disk for clone VM $112_2$ (clone delta disk 137). Base disk 135 is shared by the source VM, VM $112_1$, and the clone VM, clone VM $112_2$, as shown in FIG. 4A, which is discussed in more detail below. Base disk 135, VM1 delta disk 136, and clone delta disk 137 are used for handling of read I/O and write I/O requests by VM $112_1$ and clone VM $112_2$ during the upgrade, as discussed in more detail herein with respect to FIGS. 5-8.

At block 208, VM $112_1$ suspends GOS 114 and application(s) 116. In some embodiments, upgrade agent 122 places VM $112_1$ in maintenance mode. As shown in FIG. 3, GOS 114 and application(s) 116 are still running on clone VM $112_2$. Accordingly, GOS 114 and application(s) 116 do not experience downtime when VM $112_1$ suspends GOS 114 and application(s) 116.

At block 210, upgrade agent 122 may then execute commands to begin installation of the upgrade on VM $112_1$.

At block 212, upgrade agent 122 begins polling the status of the update of VM $112_1$. Upgrade agent 122 may poll the status of the upgrade periodically until the upgrade is complete.

While VM $112_1$ is being upgraded, at block 214, read I/O requests to unmodified data blocks may be served from base disk 135 of VM $112_1$. Unmodified data blocks refer to data blocks not changed since the cloning of VM $112_1$. Read I/O requests to modified data blocks since the cloning of VM $112_1$ may be served from the same disk as used to service a write I/O as further discussed herein. As discussed, whether a data block has been modified may be determined by scanning a delta disk bitmap of the respective VM issuing the I/O request to see if the delta disk includes a modified version of the data block. As mentioned above, base disk 135 is shared by both VM 112$_1$ and clone VM 112$_2$. Base disk 135 may be read-only during the upgrade.

While VM 112$_1$ is being upgraded, at block 216, write I/O requests from VM 112$_1$ are performed on VM1 delta disk 136 and write I/O requests from clone VM 112$_2$ are performed on clone delta disk 137. Because VM 112$_1$ is in a maintenance mode during the upgrade, write I/O requests from VM 112$_1$ may be associated with the upgrade, while write I/O requests from clone VM 112$_2$ may be associated with GOS 114 and application(s) 116. As shown in FIG. 3, base disk 135 is associated with base disk bitmap 139, VM1 delta disk 136 is associated with VM1 delta disk (DD) bitmap 140, and clone delta disk 137 is associated with clone DD bitmap 141. When a data block is changed in base disk 135, VM1 delta disk 136, or clone delta disk 137, the corresponding bitmap for the disk is updated to reflect that the data block is changed, for example, a bit corresponding to the data block in the disk bitmap is set.

It should be noted although example embodiments are described herein with a single source VM and a clone VM, the aspects described herein may be applied for a source VM having multiple child snapshots and clones each of which has a corresponding delta disk and disk bitmap.

At block 218, upgrade agent 122 receives a notification (e.g., as a result of the polling), that the upgrade of VM 112$_1$ is completed.

Once the upgrade is complete, at block 220, VM 112$_1$ and clone VM 112$_2$ are quiesced. In some embodiments, upgrade agent 122 instructs hypervisor 120 to quiesce VM 112$_1$ and clone VM 112$_2$. Hypervisor 120 stuns VM 112$_1$ and clone VM 112$_2$ for a short period while any outstanding I/Os on the VMs are flushed to memory.

At block 222, upgrade agent 122 executes commands to suspend GOS 114 and application(s) 116 on clone VM 112$_2$ and to suspend clone VM 112$_2$ from issuing new I/Os.

At this point, the scanner thread and the I/O thread may be started. The scanner and I/O threads are used, after completion of the upgrade, for merging the disks and for determining the disks for serving I/O requests during the merger of the disks, as discussed in more detail herein with respect to the FIGS. 5-8. As shown in FIG. 4A, clone VM 112$_2$ is a child VM of parent VM 112$_1$. During the merging, child VM DD 137 is asynchronously merged into parent VM DD 136 and parent VM DD 136 is asynchronously merged into base disk 135.

At block 224, upgrade agent 122 executes commands to resume running GOS 114 and application(s) 116 on VM 112$_1$.

At block 226, the scanner thread merges clone delta disk 137 into VM1 delta disk 136.

Figure 5:
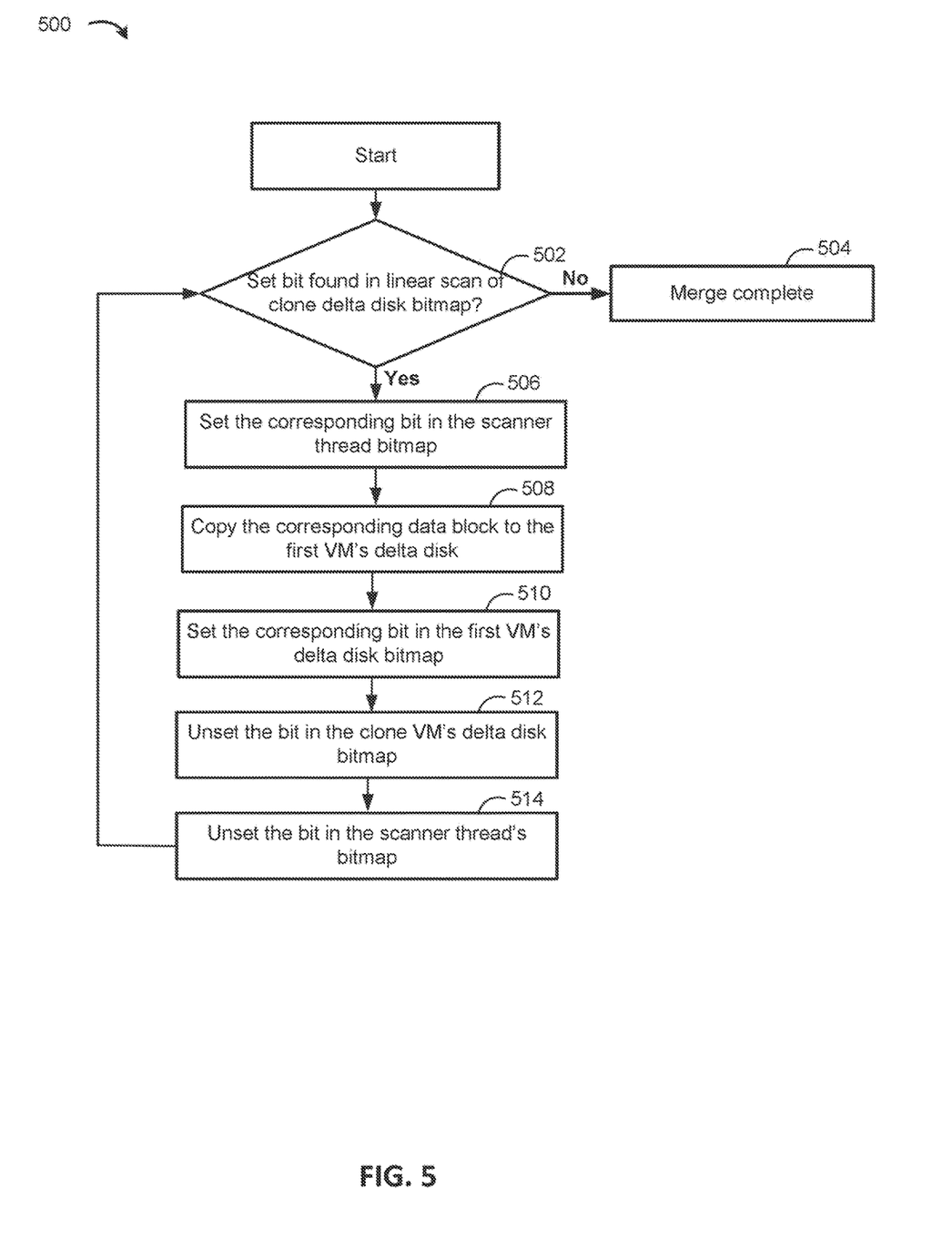
FIG. 5 illustrates an example workflow for merging the clone VM's delta disk with the first VM's delta disk, according to one or more embodiments.

FIG. 5 illustrates an example workflow 500 for merging clone delta disk 137 with VM1 delta disk 136, according to one or more embodiments. The scanner thread maintains its own bitmap, scanner bitmap 138, as shown in FIG. 3. At 502, the scanner thread linearly scans clone DD bitmap 141 for a set bit (e.g., corresponding to a changed data block in clone delta disk 137). If the scanner thread does not find any sets bits in clone DD bitmap 141, at 504, then the merger is complete.

If the scanner find a set bit (e.g., the first, or next, set bit in the linear scan), at 506, the scanner thread sets the corresponding bit in scanner bitmap 138. Setting the bit indicates that the corresponding data block is in the process of being merged. Setting the bit in scanner bitmap 138 can be used by the I/O thread to determine the correct disk to save a write I/O request when the write I/O request is received for a data block while that data block is currently being merged, as discussed in more detail herein with respect to FIG. 8.

At 508, the scanner thread copies the corresponding data block in clone delta disk 137 into VM1 delta disk 136. At 510, the scanner thread sets the corresponding bit in VM1 DD bitmap 140 (indicating the changed data block in VM1 delta disk 136). At 512, the scanner thread unsets the bit in clone DD bitmap 141 (to indicate that the changed data block is no longer located in clone delta disk 137). At 514, the scanner thread unsets the bit in scanner bitmap 138 (indicating the merger is complete for the corresponding data block). Scanner thread can then continue the scan of clone DD bitmap 141 for the next set bit, at 502.

Returning to operations 200 illustrated in FIG. 2, at block 228, the scanner thread merges VM1 delta disk 136 into base disk 135.

Figure 6:
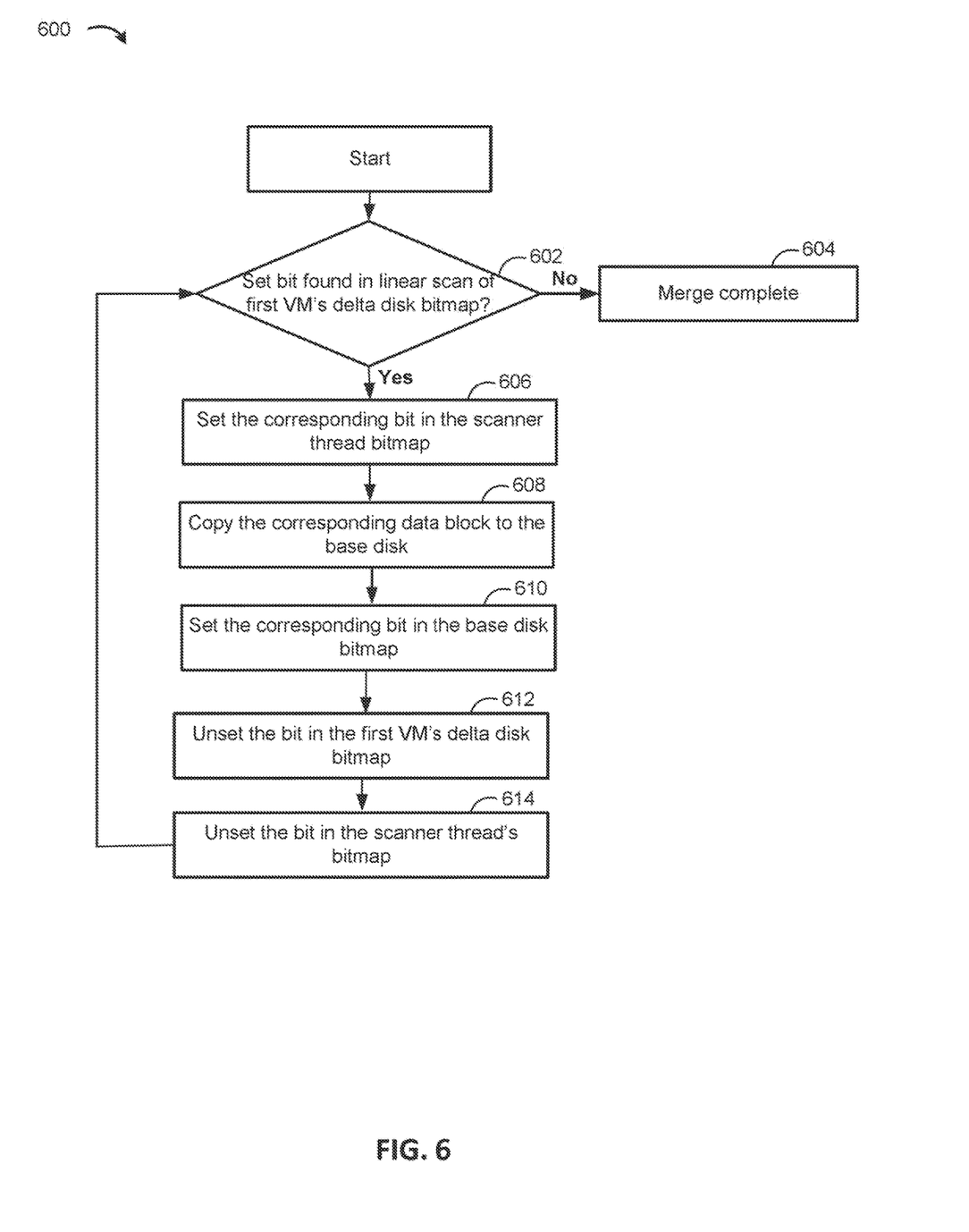
FIG. 6 illustrates an example workflow for merging the first VM's delta disk with the base disk, according to one or more embodiments.

FIG. 6 illustrates an example workflow 600 for merging the VM1 delta disk 136 with base disk 135, according to one or more embodiments.

At 602, the scanner thread linearly scans VM1 DD bitmap 140 for a set bit (e.g., corresponding to a changed data block in VM1 delta disk 136). If the scanner thread does not find any sets bits in VM1 DD bitmap 140, at 604, then the merger is complete. If the scanner find a set bit (e.g., the first, or next, set bit in the linear scan), at 606, the scanner thread sets the corresponding bit in scanner bitmap 138. At 608, the scanner thread copies the corresponding data block in VM1 delta disk 136 into base disk 135. At 610, the scanner thread sets the corresponding bit in base disk bitmap 139 (indicating the changed data block in base disk 135). At 612, the scanner thread unsets the bit in VM1 DD bitmap 140 (to indicate that the changed data block is no longer located in VM1 delta disk 136). At 614, the scanner thread unsets the bit in scanner bitmap 138 (indicating the merger is complete for the corresponding data block). Scanner thread can then continue the scan of VM1 DD bitmap 140 for the next set bit, at 602.

Returning to operations 200 illustrated in FIG. 2, while the disks are being merged, at block 230, the I/O thread serves new read I/O requests from clone delta disk 137, VM1 delta disk 136, or base disk 135.

Figure 7:
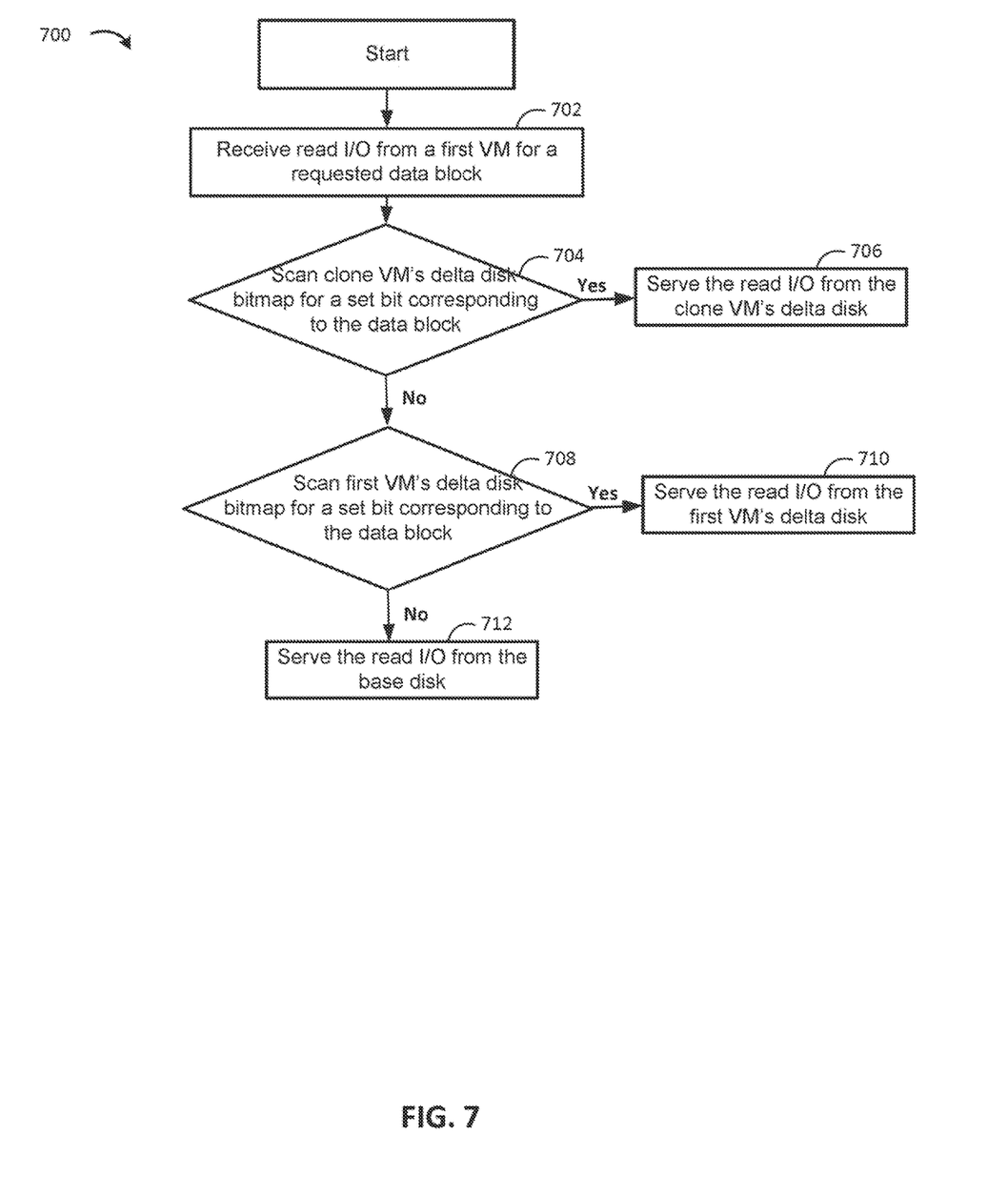
FIG. 7 illustrates an example workflow for serving a read input/output (I/O) request during disk merger, according to one or more embodiments.

FIG. 7 illustrates an example workflow 700 for serving a read I/O request during merger, when only VM 112$_1$ is running, according to one or more embodiments. At 702, a read I/O request is received from VM 112$_1$ for a requested data block. At 704, the I/O thread scans clone DD bitmap 141 for a set bit corresponding to the requested data block. If the set bit is found in clone DD bitmap 141 (indicating a changed data block is located in clone delta disk 137), then at 706, the read I/O request is served from clone delta disk 137. If the set bit is not found in clone DD bitmap 141, then at 708, the I/O thread scans VM1 DD bitmap 140 for a set bit corresponding to the requested data block.

If the set bit is found in VM1 DD bitmap 140 (indicating a changed data block is located in VM1 delta disk 136), then at 710, the read I/O request is served from VM1 delta disk 136. If the set bit is not found in VM1 DD bitmap 140, then the data block was unchanged by VM 112$_1$ and clone VM 112$_2$. At 712, the I/O thread serves the read I/O request from base disk 135.

Returning to operations 200 illustrated in FIG. 2, while the disks are being merged, at block 232, the I/O thread saves new write I/O requests to clone delta disk 137, VM1 delta disk 136, or base disk 135.

Figure 8:
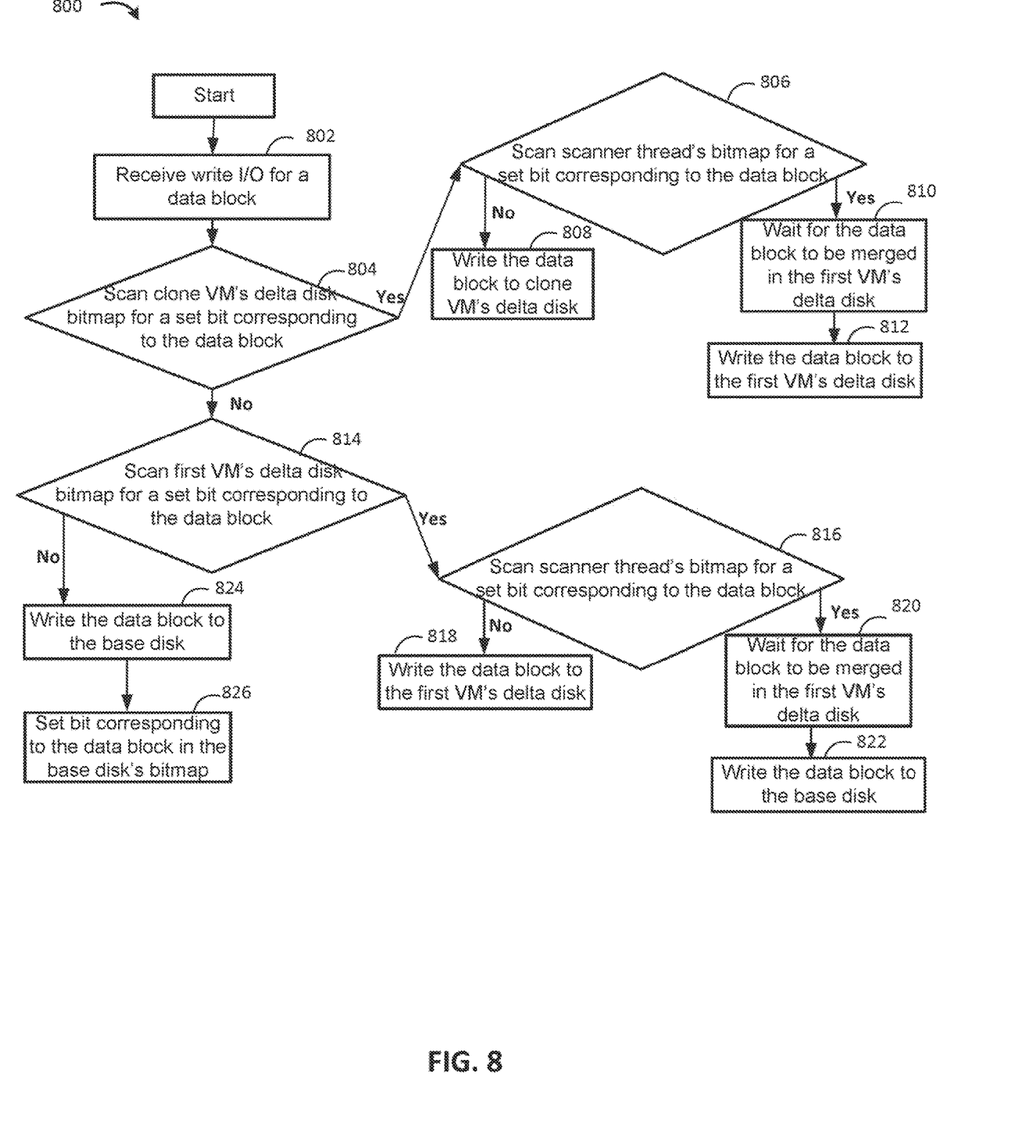
FIG. 8 illustrates an example workflow for serving a write I/O request during disk merger, according to one or more embodiments.

FIG. 8 illustrates an example workflow 800 for serving a write I/O request during disk merger, according to one or more embodiments. At 802, a new write I/O is received for a requested data block.

At 804, the I/O thread scans clone DD bitmap 141 for a set bit corresponding to the requested data block.

If a set bit is found in clone DD bitmap 141 for the requested data block, then at 806, the I/O thread scans scanner bitmap 138 for a set bit corresponding to the data block. If the I/O thread does not find a set bit corresponding to the requested data block in scanner bitmap 138 (indicating that the data block is not currently being merged), then at 808 the I/O thread writes the data block to clone delta disk 137. Returning to 806, if the I/O thread finds a set bit corresponding to the requested data block in scanner bitmap 138 (indicating that the data block is currently being merged), then at 810 the I/O thread waits for the data block to be merged (e.g., checks scanner bitmap 138 until the bit is unset, indicating the data block is not currently being merged). After waiting for the data block to be merged, at 812 the I/O thread writes the requested data block to VM1 delta disk 136.

Returning to 804, if a set bit is not found in clone DD bitmap 141 for the requested data block, and then at 814 the I/O thread scans VM1 DD bitmap 140 for a set bit corresponding to the requested data block.

If a set bit is found in VM1 DD bitmap 140 for the requested data block, then at 816, the I/O thread scans scanner bitmap 138 for a set bit corresponding to the data block. If the I/O thread does not find a set bit corresponding to the requested data block in scanner bitmap 138 (indicating that the data block is not currently being merged), then at 818 the I/O thread writes the data block to VM1 delta disk 136. Returning to 816, if the I/O thread finds a set bit corresponding to the requested data block in scanner bitmap 138 (indicating that the data block is currently being merged), then at 820 the I/O thread waits for the data block to be merged (e.g., checks scanner bitmap 138 until the bit is unset, indicating the data block is not currently being merged). After waiting for the data block to be merged, at 822 the I/O thread writes the requested data block to base disk 135.

Returning to 814, if a set bit is not found in VM1 DD bitmap 140 for the requested data block, and then at 824 the I/O thread writes the requested data block to base disk 135 and, at 826, if needed, sets the bit corresponding to the changed data block in base disk bitmap 139.

Figure 4B:
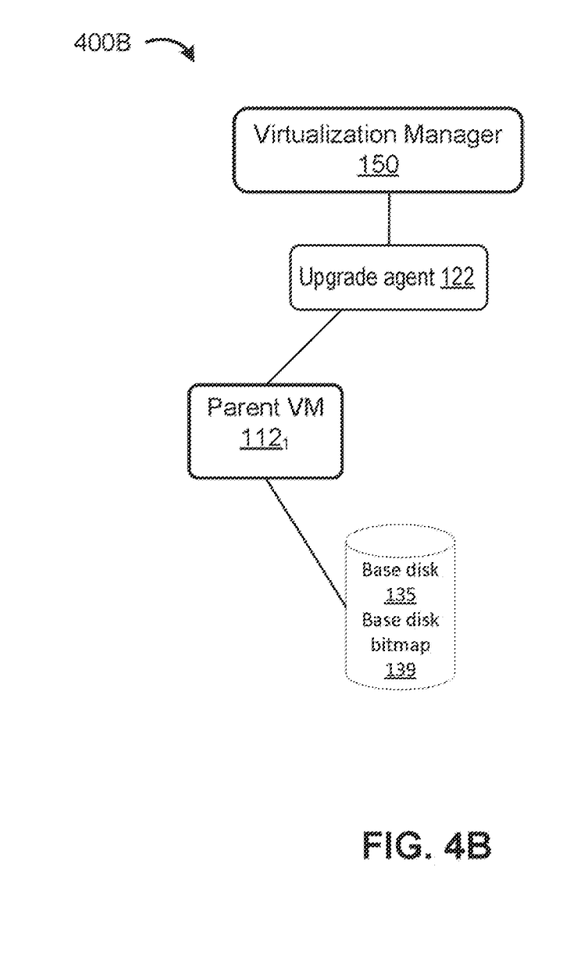
FIG. 4B depicts a block diagram conceptually illustrating the datacenter after merging the delta disks of the clone VM and the first VM, according to one or more embodiments.

Returning to operations 200 illustrated in FIG. 2, after the disks are merged, clone VM 112$_2$ is destroyed and VM1 delta disk 136, clone delta disk 137, VM1 DD bitmap 140, and clone DD bitmap 141 are deleted, as shown in FIG. 4B. Scanner bitmap 138 may also be deleted.

Figure 9:
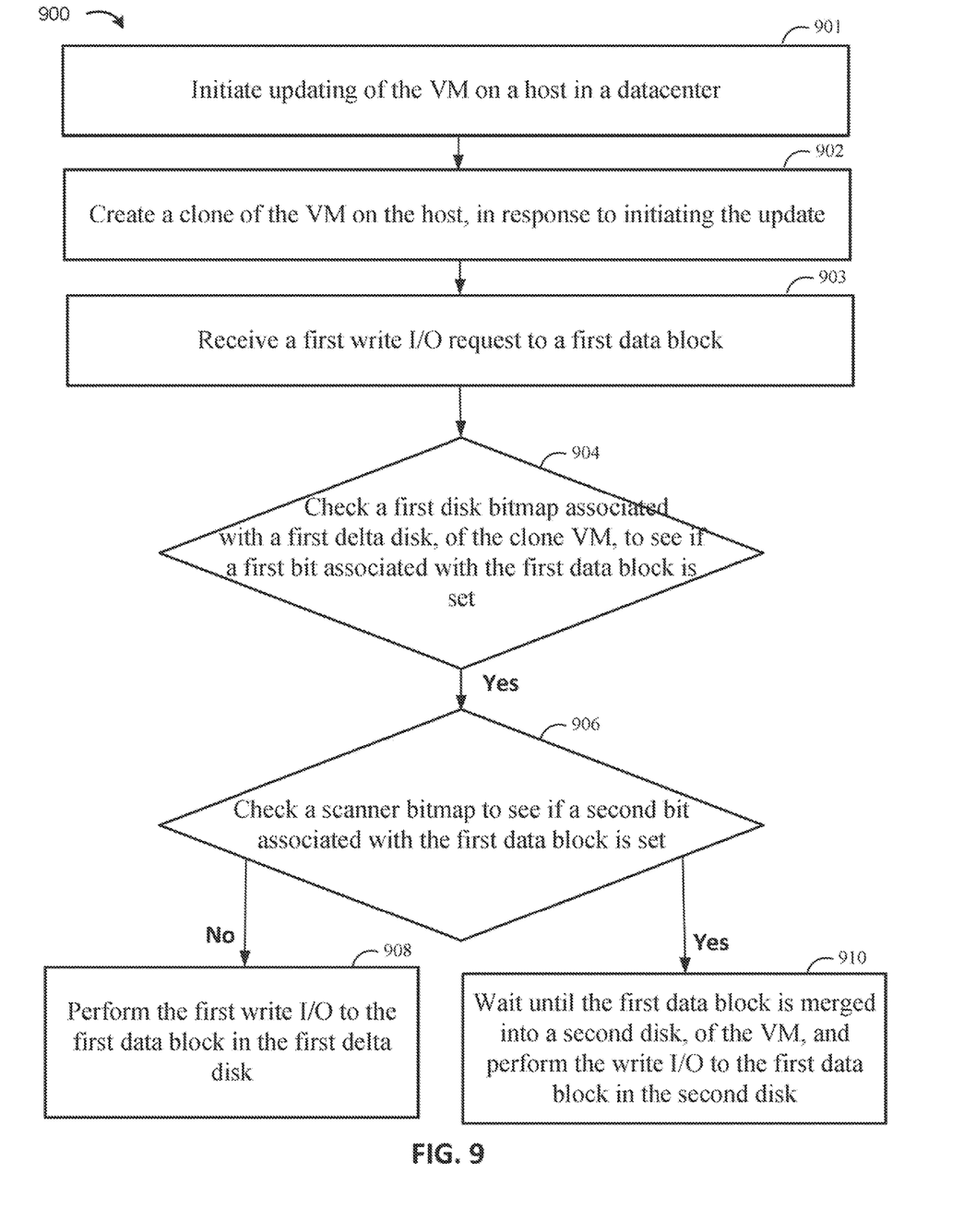
FIG. 9 depicts a flow diagram illustrating example operations for handling input/output (I/O) during disk merging of a first delta disk into a second disk, according to one or more embodiments.

FIG. 9 depicts a flow diagram illustrating example operations 900 for updating a VM (e.g., VM 112$_1$), according to one or more embodiments. Operations 900 may be performed by the I/O thread described herein.

Operations 900 may begin, at block 901, by initiating updating of the VM (e.g., VM 112$_1$) on a host (e.g., host 105) in a datacenter (e.g., data center 101).

Operations 900 include, at block 904, creating a clone of the VM (e.g., clone VM 112$_2$) on the host, in response to initiating the update;

Operations 900 may begin, at block 903, by receiving a first write I/O request to a first data block.

Operations 900 include, at block 904, checking a first disk bitmap (e.g., clone DD bitmap 141) associated with a first delta disk (e.g., clone delta disk 137) for whether a first bit associated with the first data block is set. The first disk bitmap includes a bit for each data block of the first delta disk indicating whether the data block has been modified.

Operations 900 include, at block 906, based on the first bit being set, checking a scanner bitmap (e.g., scanner bitmap 138) for whether a second bit associated with the first data block is set. The scanner bitmap includes a bit for each data block of the first delta disk indicating whether the data block is currently being merged into a second disk (e.g., VM1 delta disk 136).

Operations 900 include, at block 908, based on the second bit being not set, performing the first write I/O to the first data block in the first delta disk.

Operations 900 include, at 910, based on the second bit being set, waiting until the first data block is merged into the second disk and performing the write I/O to the first data block in the second disk after the first data block is merged into the second disk.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of updating a virtual machine (VM), the method comprising:
   initiating updating of the VM on a host in a datacenter;
   creating a clone of the VM on the host, in response to initiating the update;
   receiving a first write input/output (I/O) request for a first data block;
   checking a first disk bitmap associated with a first delta disk for whether a first bit associated with the first data block is set, wherein the first disk bitmap includes a bit for each data block of the first delta disk indicating whether the data block has been modified, and wherein the first delta disk is associated with the clone of the VM;
   based on the first bit being set, checking a scanner bitmap for whether a second bit associated with the first data block is set, wherein the scanner bitmap includes a bit for each data block of the first delta disk indicating whether the data block is currently being merged into a second disk, and wherein the second disk is associated with the VM; and
   based on the second bit being set:
      waiting until the first data block is merged into a second disk; and
      performing the first write I/O to the first data block in the second disk after the first data block is merged into the second disk.

2. The method of claim 1, further comprising:
   receiving a second write I/O request for a second data block;
   checking the first disk bitmap for whether a third bit associated with the second data block is set; and
   based on the third bit not being set:
      performing the second write I/O for the second data block in a base disk; or
      checking a second disk bitmap associated a second delta disk for whether a fourth bit associated with the second data block is set.

3. The method of claim 1, further comprising:
   receiving a read I/O request for a second data block;
   checking the first disk bitmap for whether a third bit associated with the second data block is set; and
   based on the third bit being set, serving the read I/O from the first delta disk.

4. The method of claim 1, further comprising:
   receiving a read I/O request for a second data block;
   checking the first disk bitmap for whether a third bit associated with the second data block is set; and
   based on the third bit not being set:
      serving the read I/O from a base disk; or
      checking a second disk bitmap associated a second delta disk to for whether a fourth bit associated with the second data block is set.

5. The method of claim 1, further comprising merging the first delta disk and the second disk, wherein the merging comprises:
   scanning the first disk bitmap for one or more set bits;
   for each set bit in the first disk bitmap:

setting a corresponding bit in the scanner bitmap;
copying a data block corresponding to the set bit from the first delta disk to the second disk;
setting a bit corresponding to the data block in a second disk bitmap associated with a second delta disk or a base disk bitmap;
unsetting the bit in the first disk bitmap; and
unsetting the bit in the scanner bitmap.

6. The method of claim 1, further comprising:
during the updating of the VM:
receiving a second write I/O request, from the VM, for a second data block;
performing the second write I/O to the second data block in the second disk, wherein the second disk comprises a second delta disk; and
setting a bit corresponding to the second data block in a second disk bitmap associated with the second delta disk.

7. The method of claim 1, further comprising:
during the updating of the VM:
receiving a third write I/O request, from the clone of the VM, for a third data block;
performing the third write I/O to the third data block in the first delta disk; and
setting a bit corresponding to the third data block in the first disk bitmap associated with the first delta disk.

8. The method of claim 1, further comprising:
determining the updating of the VM is completed;
stunning the VM and the clone of the VM;
completing one or more in-flight I/Os of the VM and the clone of the VM;
suspending operation of the clone of the VM; and
initiating merger of the first delta disk and the second disk.

9. A system comprising:
one or more processors; and
at least one memory, the one or more processors and the at least one memory configured to:
initiate updating of a virtual machine (VM) on a host in a datacenter;
create a clone of the VM on the host, in response to initiating the update;
receive a first write input/output (I/O) request for a first data block;
check a first disk bitmap associated with a first delta disk for whether a first bit associated with the first data block is set, wherein the first disk bitmap includes a bit for each data block of the first delta disk indicating whether the data block has been modified, and wherein the first delta disk is associated with the clone of the VM;
based on the first bit being set, check a scanner bitmap for whether a second bit associated with the first data block is set, wherein the scanner bitmap includes a bit for each data block of the first delta disk indicating whether the data block is currently being merged into a second disk, and wherein the second disk is associated with the VM; and
based on the second bit being set:
wait until the first data block is merged into the second disk; and
perform the first write I/O to the first data block in the second disk after the first data block is merged into the second disk.

10. The system of claim 9, wherein the one or more processors and the at least one memory are further configured to:
receive a second write I/O request for a second data block;
check the first disk bitmap for whether a third bit associated with the second data block is set; and
based on the third bit not being set:
perform the second write I/O to the second data block in a base disk; or
check a second disk bitmap associated a second delta disk for whether a fourth bit associated with the second data block is set.

11. The system of claim 9, wherein the one or more processors and the at least one memory are further configured to:
receive a read I/O request for a second data block;
check the first disk bitmap for whether a third bit associated with the second data block is set; and
based on the third bit being set, serve the read I/O from the first delta disk.

12. The system of claim 9, wherein the one or more processors and the at least one memory are further configured to:
receive a read I/O request for a second data block;
check the first disk bitmap for whether a third bit associated with the second data block is set; and
based on the third bit not being set:
serve the read I/O from a base disk; or
check a second disk bitmap associated a second delta disk to for whether a fourth bit associated with the second data block is set.

13. The system of claim 9, wherein the one or more processors and the at least one memory are further configured to:
scan the first disk bitmap for one or more set bits;
for each set bit in the first disk bitmap:
set a corresponding bit in the scanner bitmap;
copy a data block corresponding to the set bit from the first delta disk to the second disk;
set a bit corresponding to the data block in a second disk bitmap associated with a second delta disk or a base disk bitmap;
unset the bit in the first disk bitmap; and
unset the bit in the scanner bitmap.

14. The system of claim 9, wherein the one or more processors and the at least one memory are further configured to:
during the updating of the VM:
receive a second write I/O request, from the VM, for a second data block;
perform the second write I/O to the second data block in the second disk, wherein the second disk comprises a second delta disk; and
set a bit corresponding to the second data block in a second disk bitmap associated with the second delta disk.

15. The system of claim 9, wherein the one or more processors and the at least one memory are further configured to:
during the updating of the VM:
receive a third write I/O request, from the clone of the VM, for a third data block;
perform the third write I/O to the third data block in the first delta disk; and
set a bit corresponding to the third data block in the first disk bitmap associated with the first delta disk.

16. A non-transitory computer-readable medium comprising instructions that, when executed by one or more processors of a computing system, cause the computing system to perform operations updating a virtual machine (VM), the operations comprising:

initiating updating of the VM on a host in a datacenter;
creating a clone of the VM on the host, in response to initiating the update;
receiving a first write I/O request for a first data block;
checking a first disk bitmap associated with a first delta disk for whether a first bit associated with the first data block is set, wherein the first disk bitmap includes a bit for each data block of the first delta disk indicating whether the data block has been modified, and wherein the first delta disk is associated with the clone of the VM;
based on the first bit being set, checking a scanner bitmap for whether a second bit associated with the first data block is set, wherein the scanner bitmap includes a bit for each data block of the first delta disk indicating whether the data block is currently being merged into a second disk, and wherein the second disk is associated with the VM; and
based on the second bit being set:
  waiting until the first data block is merged into the second disk; and
  performing the first write I/O to the first data block in the second disk after the first data block is merged into the second disk.

17. The non-transitory computer-readable medium of claim 16, the operations further comprising:
receiving a second write I/O request to a second data block;
checking the first disk bitmap for whether a third bit associated with the second data block is set; and
based on the third bit not being set:
  performing the second write I/O to the second data block in a base disk; or
  checking a second disk bitmap associated a second delta disk for whether a fourth bit associated with the second data block is set.

18. The non-transitory computer-readable medium of claim 16, the operations further comprising:
receiving a read I/O request for a second data block;
checking the first disk bitmap for whether a third bit associated with the second data block is set; and
based on the third bit being set, serving the read I/O from the first delta disk.

19. The non-transitory computer-readable medium of claim 16, the operations further comprising:
receiving a read I/O request for a second data block;
checking the first disk bitmap for whether a third bit associated with the second data block is set; and
based on the third bit not being set:
  serving the read I/O from a base disk; or
  checking a second disk bitmap associated a second delta disk to for whether a fourth bit associated with the second data block is set.

20. The non-transitory computer-readable medium of claim 16, wherein the disk merging comprises:
scanning the first disk bitmap for one or more set bits;
for each set bit in the first disk bitmap:
  setting a corresponding bit in the scanner bitmap;
  copying a data block corresponding to the set bit from the first delta disk to the second disk;
  setting a bit corresponding to the data block in a second disk bitmap associated with a second delta disk or a base disk bitmap;
  unsetting the bit in the first disk bitmap; and
  unsetting the bit in the scanner bitmap.

* * * * *